Feb. 11, 1964

H. A. McINTOSH 3,120,856

PRESSURE REGULATING VALVE

Filed Dec. 5, 1960

INVENTOR
HAROLD A. McINTOSH
BY HIS ATTORNEYS
HARRIS, KIECH, RUSSELL & KERN

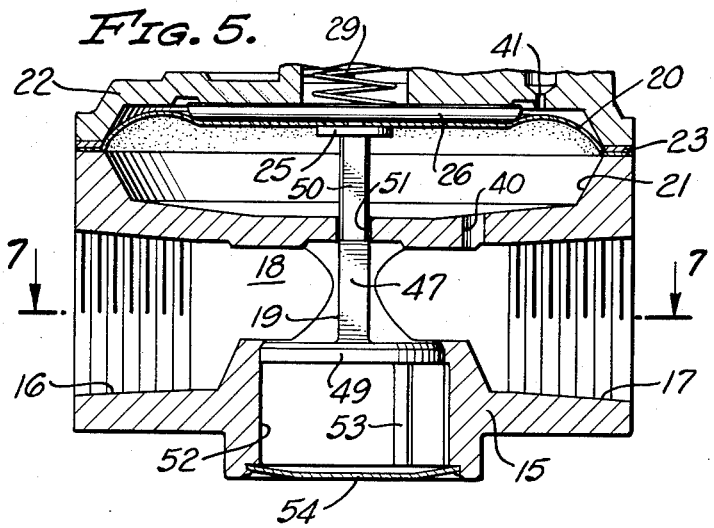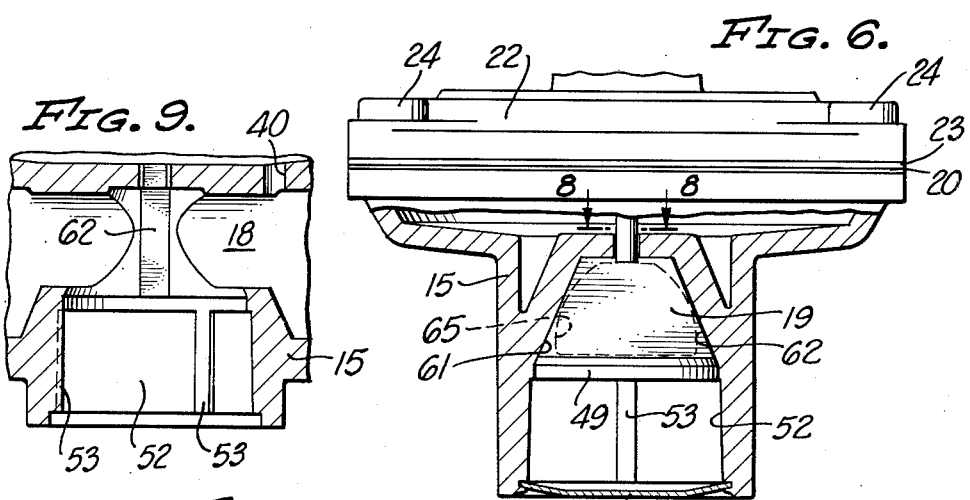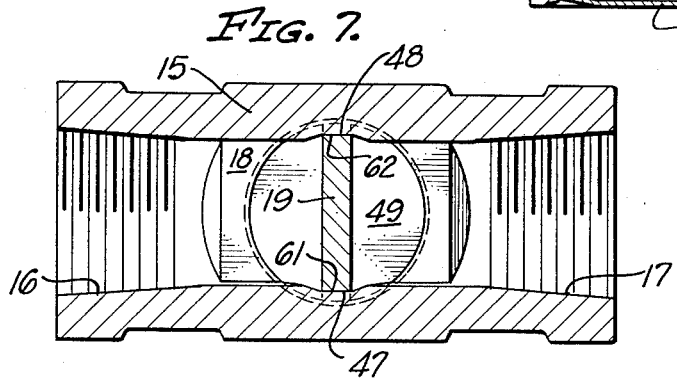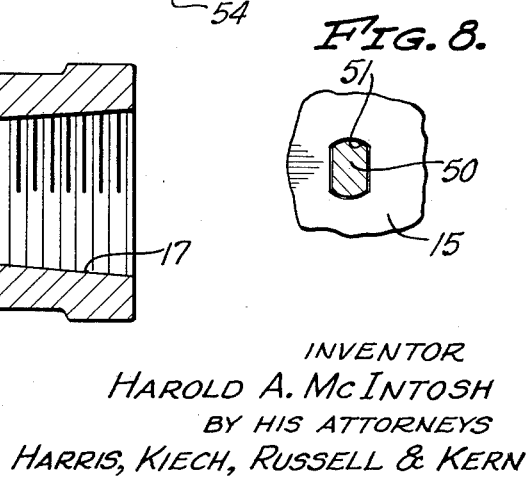
INVENTOR
HAROLD A. McINTOSH
BY HIS ATTORNEYS
HARRIS, KIECH, RUSSELL & KERN ing description. The drawings merely show and the description merely describes a preferred embodiment of the present invention which is given by way of illustration or example.

In the drawings:

FIG. 5 is a view similar to that of FIG. 3 showing the valve in the closed position;

FIG. 6 is a view similar to that of FIG. 2 showing the valve in the closed position;

FIG. 7 is a sectional view taken along the line 7—7 of FIG. 5;

FIG. 8 is an enlarged partial sectional view taken along the line 8—8 of FIG. 6; and FIG. 9 is a view similar to that of FIG. 5 showing the throat section of the valve body with the valve member removed.

Figure 1:
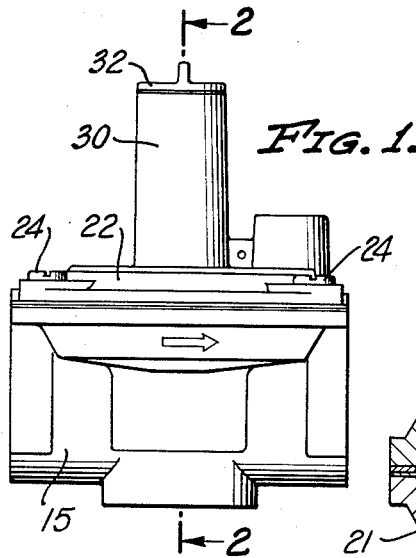
FIG. 1 is a side view of a preferred embodiment of the valve.

The pressure regular valve shown in the drawings includes a body 15 having an inlet 16 and an outlet 17 interconnected by a flow passage indicated generally at 18. The inlet and outlet are circular in cross section and have conventional pipe threads formed therein for coupling the valve into a pipeline. A valve member 19 is positioned in the body 15 for movement along a vertical axis.

In the particular embodiment shown herein, the valve member 19 is driven by a diaphragm 20 positioned in a chamber 21 formed between the body 15 and a cap 22. The diaphragm 20 and a gasket 23 are clamped between the body and cap by screws 24.

A washer 25, the diaphragm 20, a plate 26 and another washer 27 are fixed on a tubular extension 28 of the valve member 19 by riveting or the like to provide a connection between the diaphragm and the valve member. A coil spring 29 is positioned in a tubular extension 30 of the cap 22 between a threaded plug 31 and the washer 27 to provide a downward force on the diaphragm 20. The tubular extension 30 is closed by a cap 32 and gasket 33.

The diaphragm 20 divides the chamber 21 into two zones so that a pressure differential in the zone will control the position of the valve member connected to the diaphragm. In the particular embodiment shown herein, an opening 40 provides communication between the lower zone of the chamber and the outlet 17. Another opening 41 provides communication between the upper zone of the chamber and the surrounding atmosphere. Hence, the position of the valve member is a function of the upward force exerted on the diaphragm by the fluid at the outlet side of the valve and the downward force exerted on the diaphragm by the spring 29 and atmospheric pressure. The spring force is controlled by the position of the plug 31. When desired, pressure sources other than atmospheric can be used in the operation of the valve by coupling the source to the chamber, such as by making a connection to the pipe threaded opening 42. Of course, the spring 29 may be omitted or may be used to aid the force due to the outlet pressure rather than oppose it for certain applications of the valve.

Figure 4:
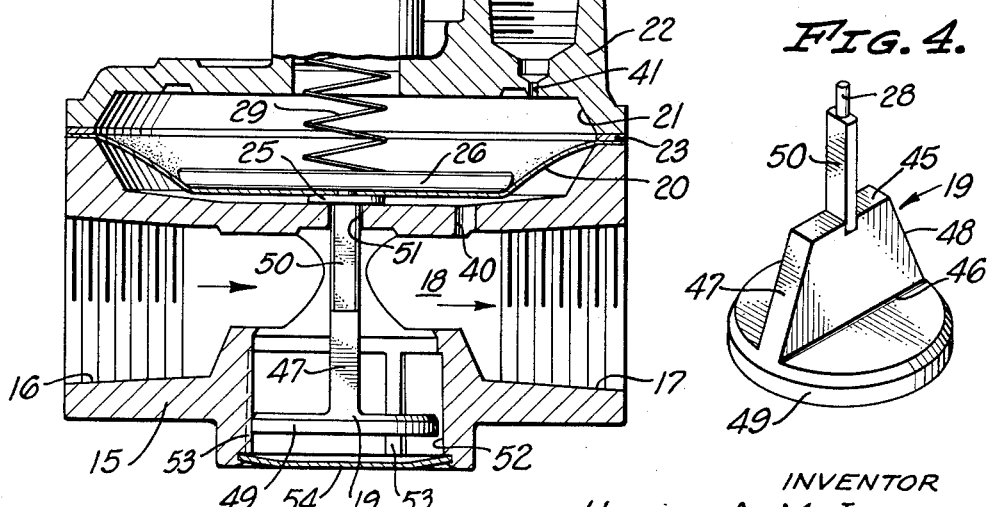
FIG. 4 is an isometric view of the valve member.

The preferred form for the valve member 19 is shown in FIG. 4. That portion of the valve which serves to block the flow passage 18 is trapezoidal in cross section having parallel upper and lower edges 45, 46 respectively. The upper edge 45 is shorter than the lower edge 46 so that the sides 47, 48 slope upward and inward. The sides 47, 48 preferably have flat faces, as does the upper edge

---

3,120,856
PRESSURE REGULATING VALVE
Harold A. McIntosh, South Pasadena, Calif., assignor, by mesne assignments, to Rehrig Pacific Co., Los Angeles, Calif., a corporation of California
Filed Dec. 5, 1960, Ser. No. 73,588
4 Claims. (Cl. 137—505.36)

This invention relates to flow control valves and, in particular, to valves with relatively small total volume and relatively high flow capacities. The invention will be described herein as used in a gas pressure regulator valve but is, of course, applicable to other valve applications.

One or more flow control valves are used in various home and industrial appliances, including water heater, space heaters, cooking stoves, clothes driers and the like. The constant competition for lower prices and better quality in gas appliances calls for better and less expensive flow control devices. It is an object of the present invention to provide a new and novel valve which is smaller in size and less expensive than presently known valves. A further object is to provide a flow control valve which will provide higher flow rates than present day valves of the same size and which will provide more sensitive and accurate control of pressure and rate of flow.

It is a particular object of the invention to provide a new flow control valve having a valve seat disposed in a plane perpendicular to the axis of the flow passage and a valve member carried in the valve body for movement toward and away from the seat. A further object is to provide a valve wherein the flow passage has a trapezoidal cross section. A specific object of the invention is to provide such a valve wherein the parallel sides of the trapezoidal cross section are disposed perpendicular to the direction of motion of the valve member, with one of the parallel sides of greater length than the other.

It is an object of the invention to provide a flow control valve including a valve seat of trapezoidal cross section and a valve member positioned for movement toward and away from the seat with the valve member having a corresponding trapezoidal cross section for engaging the seat. A further object is to provide such a valve wherein the valve member may have parallel flat sides facing the inlet and outlet. A further object is to provide such a valve wherein the valve member may carry a base which functions as a guide for the moving valve member and also defines one parallel side of the trapezoidal cross section thereof.

It is another object of the invention to provide a valve having a valve seat with opposed flat surfaces and a valve member for movement toward and away from the seat with the valve member having corresponding opposed flat surfaces for engaging the valve seat. A further object is to provide such a structure wherein the flat surfaces of the valve seat lie in planes which are substantially tangent to the circular cross sections of the inlet and outlet. Another object is to provide such a structure wherein the nonparallel sides of the trapezoidal cross section are arcuate with substantially the same radius as the circular cross sections of the inlet and outlet.

It is a specific object of the invention to provide a new valve having a trapezoidal throat section and corresponding trapezoidal valve member for actuation by a differential pressure-driven diaphragm carried on the valve body. A further object is to provide such a structure which may be used as a pressure regulator with one side of the diaphragm exposed to the downstream or regulated side of the valve and the other side of the diaphragm exposed to a reference pressure such as the atmosphere.

The invention also comprises novel details of construction and novel combinations and arrangements of parts, which will more fully appear in the course of the following 45. A base 49 is carried at the lower edge 46 and a stem 50 terminating in the tubular extension 28 is fixed to the upper edge 45. The stem 50 has two flat sides and is slidably positioned in an opening 51 in the body having a corresponding shape for preventing rotation of the valve member (FIG. 8). The base 49 of the valve member rides in a substantially cylindrical opening 52 in the body 15, for opening 52 preferably having inwardly projecting ribs 53 for guiding the valve member during upward and downward movement. A cover plate 54 is fixed in the body at the open end of the opening 52.

Figure 2:
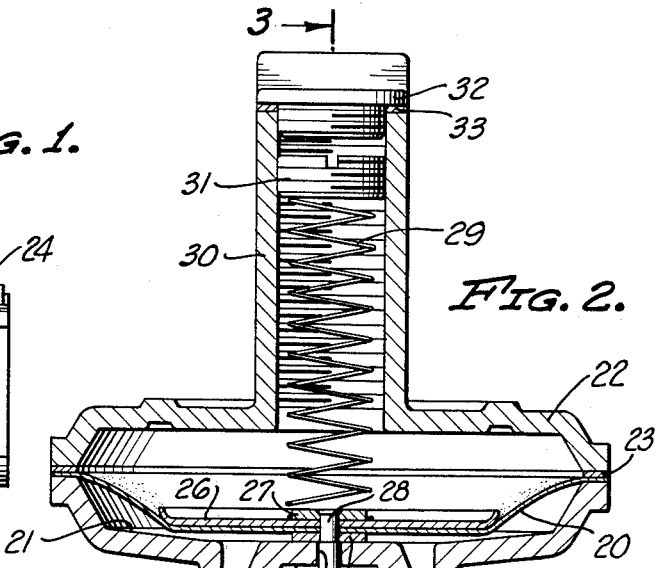
FIG. 2 is an enlarged sectional view taken along the line 2—2 of FIG. 1 showing the valve in the open position.

A valve seat is provided in the flow passage 18 and is best seen in FIGS. 2 and 9. The valve seat is trapezoidal in cross section corresponding to the shape of the valve member, with sloping flat sides 61, 62 and a flat top 63. When in the upper position as shown in FIG. 6, the valve member engages the valve seat and substantially blocks flow through the valve. When in the down position of FIG. 2, the valve member 19 is almost completely out of the flow passage, permitting substantially unrestricted flow through the valve. The throat 65 of the flow passage 18 is trapezoidal in cross section with the horizontal edges being parallel and the vertical edges being arcuate and of substantially the same radius as the inlet and outlet openings (FIGS. 2 and 6). The flat surfaces 61, 62 of the seat lie in planes which are substantially tangent to the arcuate sections of the throat, the departure from tangency being primarily due to casting and machining convenience.

The trapezoidal shape employed in the present valve permits obtaining a maximum rate of flow for the open position while requiring the minimum physical size for the valve structure which will permit throttling of the flow to substantially zero. The shape provides the desired full open fluid passage area with a minimum valve travel for closure. With the upper edge of the trapezoid shorter than the lower edge, the change in aperture per unit displacement of the valve member is less near the upper or closed position than near the lower or full open position. This arrangement provides maximum sensitivity for the flow control at the minimum rate of flow which is highly desirable in conventional pressure regulator applications. It should be noted that the upper edge could be made greater in length than the lower edge to provide the inverse characteristics, i.e., a fast opening characteristic which is sometimes desired. Other variations in the trapezoidal shape, such as four straight sides joined by suitable radii, may be utilized.

Applicant's valve will provide the same rate of flow and pressure drop as corresponding prior art valves which are more than double the size and weight of applicant's valve. When compared with prior art valves of approximately the same size and weight, applicant's valve is far superior in rate of flow for a given pressure drop.

The uniformity of operation of a gas regulator at various rates of flow is dependent upon the accuracy of the coupling of the downstream pressure to the diaphragm chamber. While a simple opening through the wall between the valve outlet and the diaphragm chamber will provide pressure communication, manufacturers of commercial regulators have had to utilize other techniques, such as a tube having one opening positioned in the center of the outlet passage with the other opening communicating with the diaphragm chamber, in order to obtain relatively uniform regulation over the necessary range of flow rates at which regulators are operated.

Figure 3:
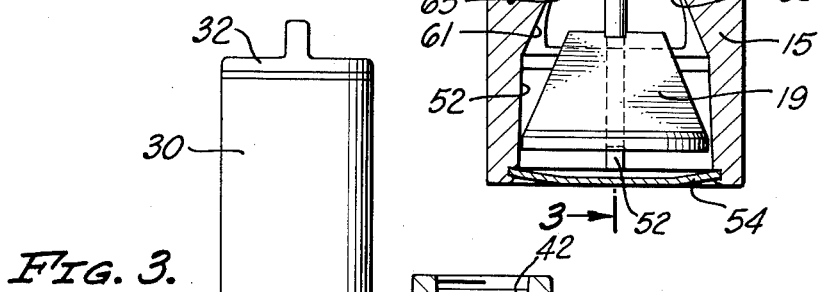
FIG. 3 is a sectional view taken along the line 3—3 of FIG. 2.

It has been found that tubes and other complicated structures can be eliminated by placing an opening at the transition point between the flat top of the trapezoidal throat section and the circular outlet, as shown at 40 in FIGS. 3, 5 and 9. With the pressure opening at this transition point, uniform regulator operation is achieved over the operating range required for commercial regulators.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a valve, the combination of:
   a body having a circular inlet and a circular outlet with a flow passage therebetween and having a diaphragm chamber, said flow passage including a first throat section, a valve seat and a second throat section in axial alignment, with said throat sections having a trapezoidal cross section with the center of area of the trapezoidal cross section offset from the center line of the circular inlet along a line perpendicular to the parallel sides of the trapezoidal cross section and with said circular outlet changing to the adjacent trapezoidal throat section at a transition zone,
   a valve member carried in said body disposed between said throat sections for movement toward and away from said seat;
   a diaphragm positioned in said chamber dividing said chamber into two zones, said body including means providing a flow path between one of said chamber zones and said transition zone;
   and means for connecting said diaphragm to said valve member in driving relation whereby a change in pressure differential in said zones will move said valve member relative to said seat.

2. In a valve, the combination of:
   a valve body having a circular inlet and a circular outlet aligned along and spaced apart along an inlet-outlet axis,
   said valve body having a flow passage between and interconnecting said inlet and said outlet with its center of area laterally offset to one side of said inlet-outlet axis,
   said flow passage including two aligned throat sections having a valve seat therebetween,
   said throat sections having walls which parallel said inlet-outlet axis,
   said throat sections and said valve seat being trapezoidal in cross section and having sides which converge laterally in the direction of lateral offset of the center of area of said flow passage from said inlet-outlet axis;
   a valve member carried in said valve body between said throat sections and movable toward and away from said valve seat in the direction of lateral offset of the center of area of said flow passage from said inlet-outlet axis; and
   means interconnecting said valve body and said valve member for moving said valve member toward and away from said valve seat.

3. In a valve, the combination of:
   a valve body having a circular inlet and a circular outlet aligned along and spaced apart along an inlet-outlet axis,
   said valve body having a flow passage between and interconnecting said inlet and said outlet with its center of area laterally offset to one side of said inlet-outlet axis,
   said flow passage including two aligned throat sections having a valve seat therebetween,
   said throat sections and said valve seat having walls which parallel said inlet-outlet axis,
   said throat sections and said valve seat being trapezoidal in cross section and having sides which converge laterally in the direction of lateral offset of the center of area of said flow passage from said inlet-outlet axis,
   said convergent sides of said throat sections being concave and said convergent sides of said valve seat being flat and substantially tangent to said concave sides of said throat sections;

a valve member carried in said valve body between said throat sections and movable toward and away from said valve seat in the direction of lateral offset of the center of area of said flow passage from said inlet-outlet axis, said valve member being trapezoidal in cross section and having flat convergent sides respectively seatable against the flat convergent sides of said valve seat; and means interconnecting said valve body and said valve member for moving said valve member toward and away from said valve seat.

4. In a valve, the combination of: a body having a gas flow path therethrough comprising a circular inlet and a circular outlet with a flow passage therebetween and having a diaphragm chamber, said flow passage including a first throat section, a valve seat and a second throat section in axial alignment, with said throat sections having a trapezoidal cross section with the center of area of the trapezoidal cross section offset from the center line of the circular inlet along a line perpendicular to the parallel sides of the trapezoidal cross section;

a valve member carried in said body disposed between said throat sections for movement toward and away from said seat;

a diaphragm positioned in said chamber dividing said chamber into two zones, said body including means providing a second flow path between one of said chamber zones and said gas flow path downstream from said valve seat; and means for connecting said diaphragm to said valve member in driving relation whereby a change in pressure differential in said chamber zones will move said valve member relative to said seat.

References Cited in the file of this patent

UNITED STATES PATENTS

| | | |
|---|---|---|
| 631,699 | Darragh et al. | Aug. 22, 1899 |
| 1,556,310 | Crockett | Oct. 6, 1925 |
| 2,089,848 | Hoferle | Aug. 10, 1937 |
| 2,420,849 | Wilson | May 20, 1947 |
| 2,668,396 | Kern | Feb. 9, 1954 |
| 2,757,683 | Biggle | Aug. 7, 1956 |
| 2,953,346 | Liecke | Sept. 20, 1960 |